(12) United States Patent
Chang et al.

(10) Patent No.: US 6,873,390 B2
(45) Date of Patent: Mar. 29, 2005

(54) REFLECTIVE LIQUID CRYSTAL DISPLAY APPARATUS

(75) Inventors: Wei-Chih Chang, Chupei (TW); Fu-Jen Ko, Hsinchu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/438,660

(22) Filed: May 14, 2003

(65) Prior Publication Data

US 2004/0119930 A1 Jun. 24, 2004

(30) Foreign Application Priority Data

Dec. 23, 2002 (TW) ........................................ 91137025 A

(51) Int. Cl.[7] ...................... G02F 1/1335; G02F 1/1339
(52) U.S. Cl. ........................ 349/156; 349/106; 349/113
(58) Field of Search ................................. 349/113, 112, 349/155, 86, 102, 156, 106; 445/24

(56) References Cited

U.S. PATENT DOCUMENTS

| | | | | |
|---|---|---|---|---|
| 5,490,001 A | * | 2/1996 | Konuma | ........................ 349/86 |
| 5,499,128 A | * | 3/1996 | Hasegawa et al. | ........... 349/155 |
| 6,300,990 B1 | * | 10/2001 | Yamaguchi et al. | ........ 349/112 |
| 6,433,845 B1 | * | 8/2002 | Suzuki et al. | ................ 349/102 |
| 2002/0151246 A1 | * | 10/2002 | Ikeda et al. | .................... 445/24 |

* cited by examiner

*Primary Examiner*—Huyen Ngo
(74) *Attorney, Agent, or Firm*—Ladas & Parry LLP

(57) ABSTRACT

A reflective liquid crystal display apparatus. The reflective liquid crystal display apparatus includes a substrate having a first region and a second region; a reflective layer disposed on the substrate in the first region; a photo spacer disposed on the substrate in the second region; a conductive layer disposed on the photoresist spacer; a liquid crystal layer interposed among the reflective layer, the photoresist spacer, and the conductive layer; a color filter layer disposed on the conductive layer; a compensation layer disposed on the color filter layer; and a polarization plate disposed on the compensation layer.

5 Claims, 2 Drawing Sheets

FIG. 1 ( RIOR ART )

REFLECTIVE LIQUID CRYSTAL DISPLAY APPARATUS

BACKGROUND OF THE INVENTION

1. Field of the Invention

The present invention relates to a reflective liquid crystal display apparatus, and more particularly to a reflective liquid crystal display apparatus not requiring a black matrix to shield light leakage around the photo spacer.

2. Description of the Prior Art

Liquid crystal displays (LCDs) can be generally divided into light penetration type (transmissive) LCDs requiring backlight and reflective LCDs reflecting environmental light.

Many efforts have been made to increase the display quality of reflective LCDs. FIG. 1 is a cross-section of the conventional reflective liquid crystal display (LCD). Referring to FIG. 1, the reflective LCD includes an aluminum reflective layer 12 disposed on a substrate 10; a photo spacer (photoresist spacer) 14 disposed on the aluminum reflective layer 12; an ITO conductive layer disposed on the photo spacer 14; liquid crystal molecules 13 interposed among the aluminum reflective layer 12, the photo spacer 14, and the ITO conductive layer 16; a color filter layer 18 disposed on the ITO conductive layer 16; a black matrix 20 disposed on the color filter layer 18; a compensation layer 22 disposed on the black matrix 20; a protective layer 19 filled in the interfacial space; and a polarization plate 24 disposed on the compensation layer 22.

Still referring to FIG. 1, in the ordinary state, the light entering the reflective LCD is reflected by the aluminum reflective layer 12, passes through liquid crystal molecules 13, and is then emitted as image light A shown in FIG. 1.

However, during conventional reflective LCD fabrication, incomplete rubbing or residue deposition from rubbing easily occurs around the photo spacer 14, thus causing inferior orientation of liquid crystal molecules. The numeral 13' indicates liquid crystal molecules with inferior orientation due to incomplete rubbing or residue deposition from rubbing. In this condition, the light entering the reflective LCD is reflected by the aluminum reflective layer 12, passes through the inferior oriented liquid crystal molecules 13', and then emits out as light leakage B.

In order to alleviate the above-mentioned light leakage B shown in FIG. 1, a conventional method is to place a black matrix 20 on the color filter layer 18 to shield light leakage B from reflecting to the human eye. In this way, image quality will not decrease. However, an additional step of placing the black matrix is required, thus increasing production cost.

SUMMARY OF THE INVENTION

An object of the present invention is to solve the above-mentioned problems and provide a reflective liquid crystal display not requiring a black matrix to shield light leakage around the photo spacer. Specifically, the reflective liquid crystal display of the present invention removes the aluminum reflector around the photo spacer. Thus, light leakage is not reflected onto the human eye and shielding of light leakage is achieved. Since the reflective liquid crystal display of the present invention does not require an additional step of forming a black matrix for shielding light leakage, production cost is effectively decreased.

To achieve the above object, the reflective liquid crystal display apparatus of the present invention includes a substrate having a first region and a second region; a reflective layer disposed on the substrate in the first region; a photo spacer disposed on the substrate in the second region; a conductive layer disposed on the photo spacer; a liquid crystal layer interposed among the reflective layer, the photo spacer, and the conductive layer; a color filter layer disposed on the conductive layer; a compensation layer disposed on the color filter layer; and a polarization plate disposed on the compensation layer.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
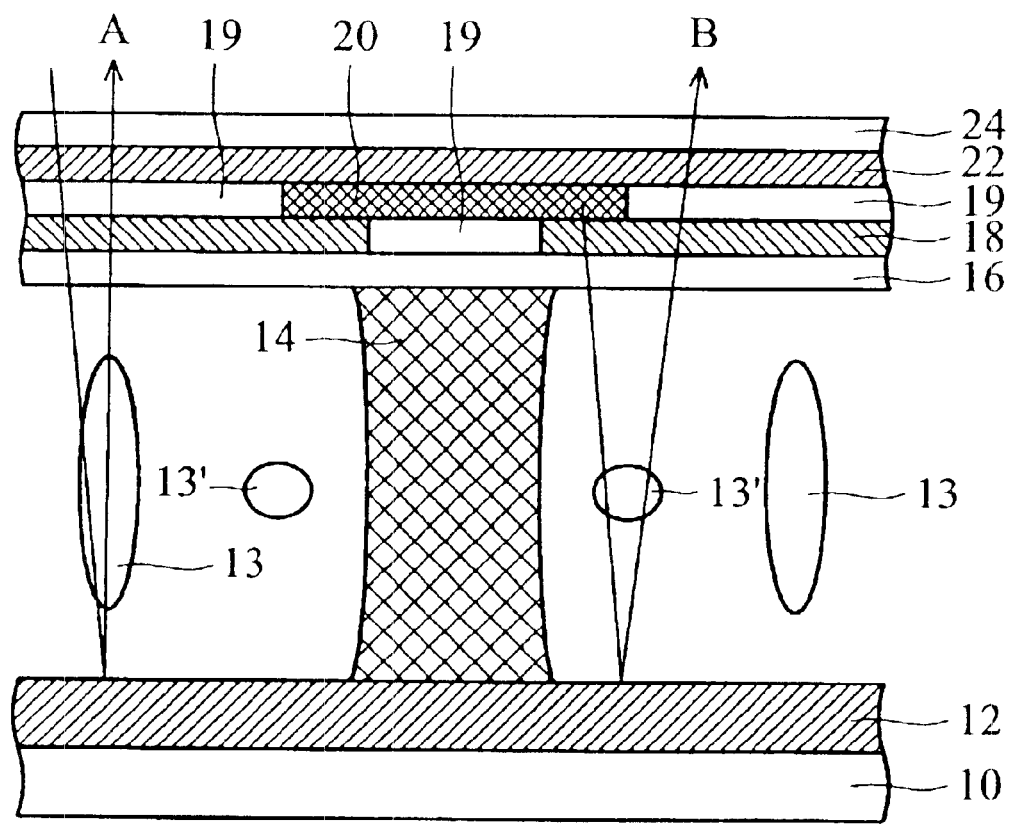
FIG. 1 is a cross-section of the conventional reflective LCD.
Figure 2:
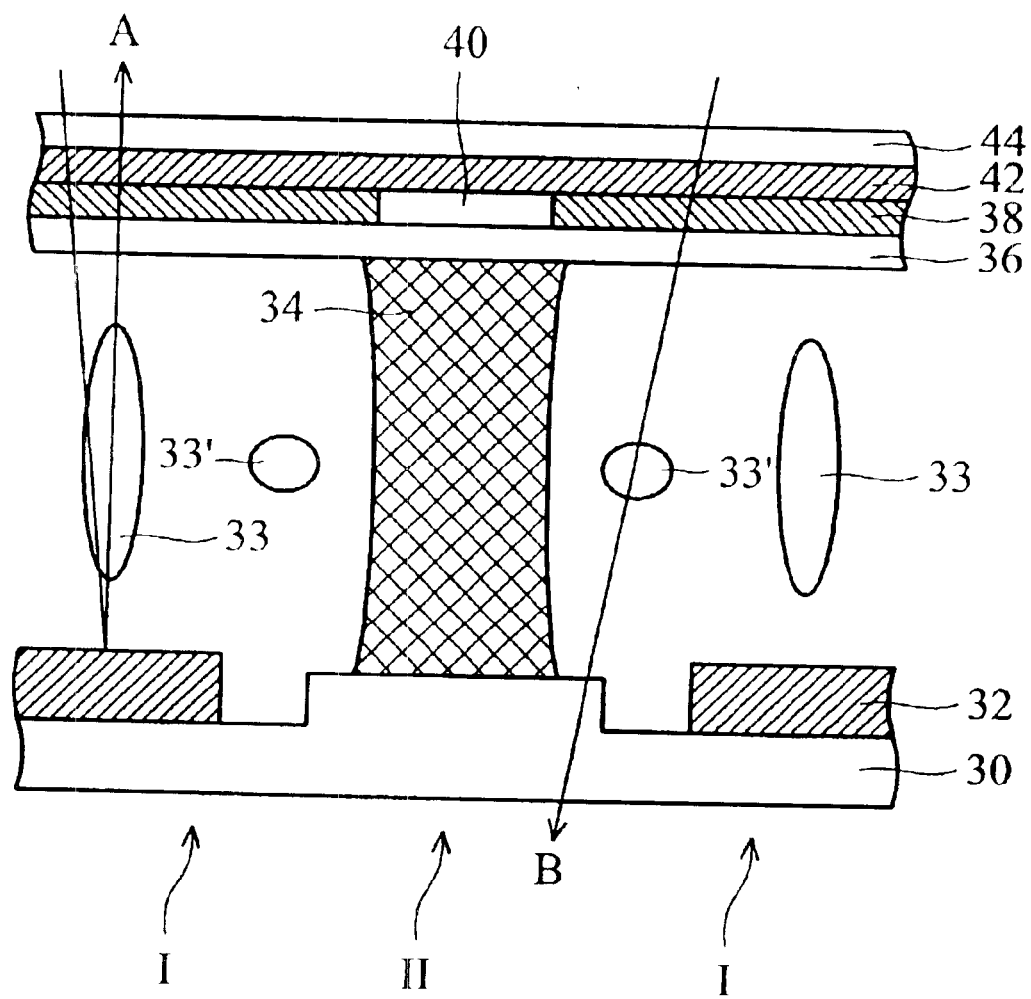
FIG. 2 is a cross-section of the reflective LCD of the present invention.

FIG. 2 is a cross-section of the reflective liquid crystal display (LCD) of the present invention. Referring to FIG. 2, the reflective LCD includes a substrate 30 having a first region I and a second region II; a reflective layer (reflector) 32 disposed on the substrate 30 in the first region I; a photo spacer 34 directly disposed on the substrate 30 in the second region II; a conductive layer 36 disposed on the photo spacer 34; liquid crystal molecules 33 interposed among the reflective layer 32, the photo spacer 34, and the conductive layer 36; a color filter layer 38 disposed on the conductive layer 36; a compensation layer (compensator) 42 disposed on the color filter layer 38; and a polarization plate (polarizer) 44 disposed on the compensation layer 42.

The feature of the present invention resides in that the reflective layer 32 is disposed on the substrate 30 in the first region I and the photo spacer 34 is directly disposed on the substrate 30 in the second region II. The first region I and the second region IT do not overlap. Therefore, no reflective layer is present around the bottom position of the photo spacer 34.

In addition, the reflective LCD of the present invention can also include a protective layer 40 filling the interfacial space between the color filter layer 38 and the compensation layer 42. Moreover, the numeral 33 in FIG. 2 indicates liquid crystal molecules with proper orientation and the numeral 33' liquid crystal molecules with inferior orientation due to incomplete rubbing or residue deposition from rubbing.

As shown in FIG. 2, the reflective LCD of the present invention does not have a reflective layer around the bottom position of the photo spacer 34. Thus, after the light entering the reflective LCD passes through the inferior oriented liquid crystal molecules 33', it directly transmits through the substrate 30 and emits out without reflection (as shown in light leakage B in FIG. 2). Thus, light leakage is not reflected onto the human eye and the same result of shielding light leakage is achieved. Moreover, the reflective LCD of the present invention does not require an additional black matrix for shielding light leakage, thus effectively decreasing production cost.

In addition, the photo spacer 34 can be polymer material. The reflective layer 32 can be an aluminum reflective layer. The conductive layer 36 can be an indium tin oxide (ITO) layer.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A reflective liquid crystal display apparatus comprising:
   a substrate having a surface, wherein the surface comprises a first region and a second region;
   a reflective layer disposed on the substrate in the first region;
   a photo spacer disposed on the substrate in the second region, wherein the first region and the second region have a horizontal distance therebetween;
   a conductive layer disposed on the photo spacer;
   a liquid crystal layer interposed among the reflective layer, the photo spacer, and the conductive layer;
   a color filter layer disposed on the conductive layer;
   a compensation layer disposed on the color filter layer; and 2. The reflective liquid crystal display apparatus as claimed in claim 1, wherein the photo spacer is made of polymer material.

3. The reflective liquid crystal display apparatus as claimed in claim 1, wherein the reflective layer is an aluminum reflective layer.

4. The reflective liquid crystal display apparatus as claimed in claim 1, wherein the conductive layer is an indium tin oxide (ITO) layer.

5. A reflective liquid crystal display apparatus comprising:
   a substrate having a surface, wherein the surface comprises a first region and a second region;
   a reflective layer disposed on the substrate in the first region;
   a photo spacer disposed on the substrate in the second region, wherein the reflective layer and the photo spacer have a horizontal distance therebetween;
   a conductive layer disposed on the photo spacer;
   a liquid crystal layer interposed among the reflective layer, the photo spacer, and the conductive layer;
   a color filter layer disposed on the conductive layer;
   a compensation layer disposed on the color filter layer; and
   a polarization plate disposed on the compensation layer.

* * * * *